Figure 1:
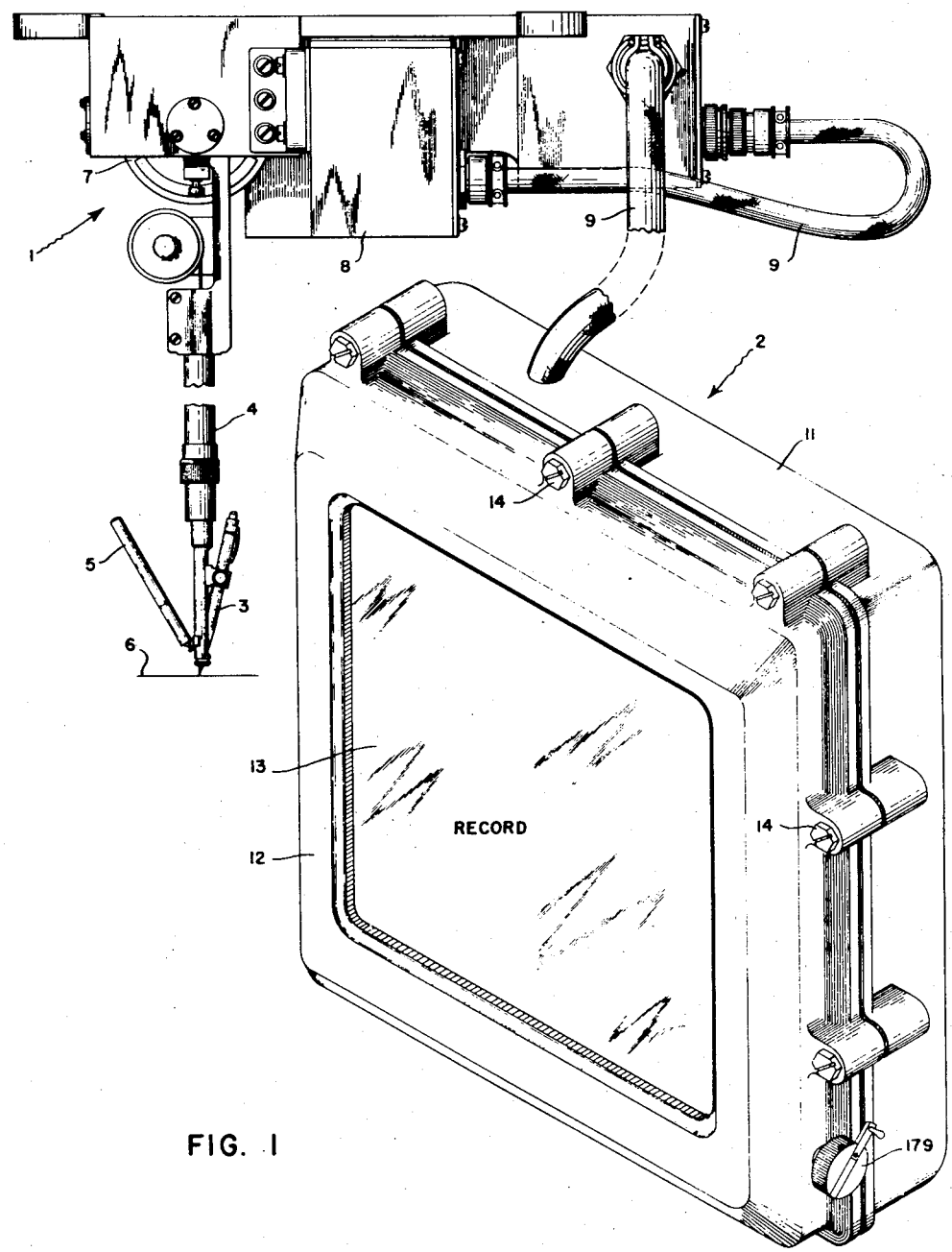

Sept. 4, 1951   G. W. BARNES, JR., ET AL   2,566,546
TELAUTOGRAPHIC INSTRUMENT
Filed Oct. 6, 1945   6 Sheets-Sheet 1

INVENTOR.
GEORGE W. BARNES JR.
RICHARD M. JOHNSON
BY WALTER P. WILLS

*E. Wellford Mason*

ATTORNEY.

Sept. 4, 1951  G. W. BARNES, JR., ET AL  2,566,546
TELAUTOGRAPHIC INSTRUMENT
Filed Oct. 6, 1945  6 Sheets-Sheet 2
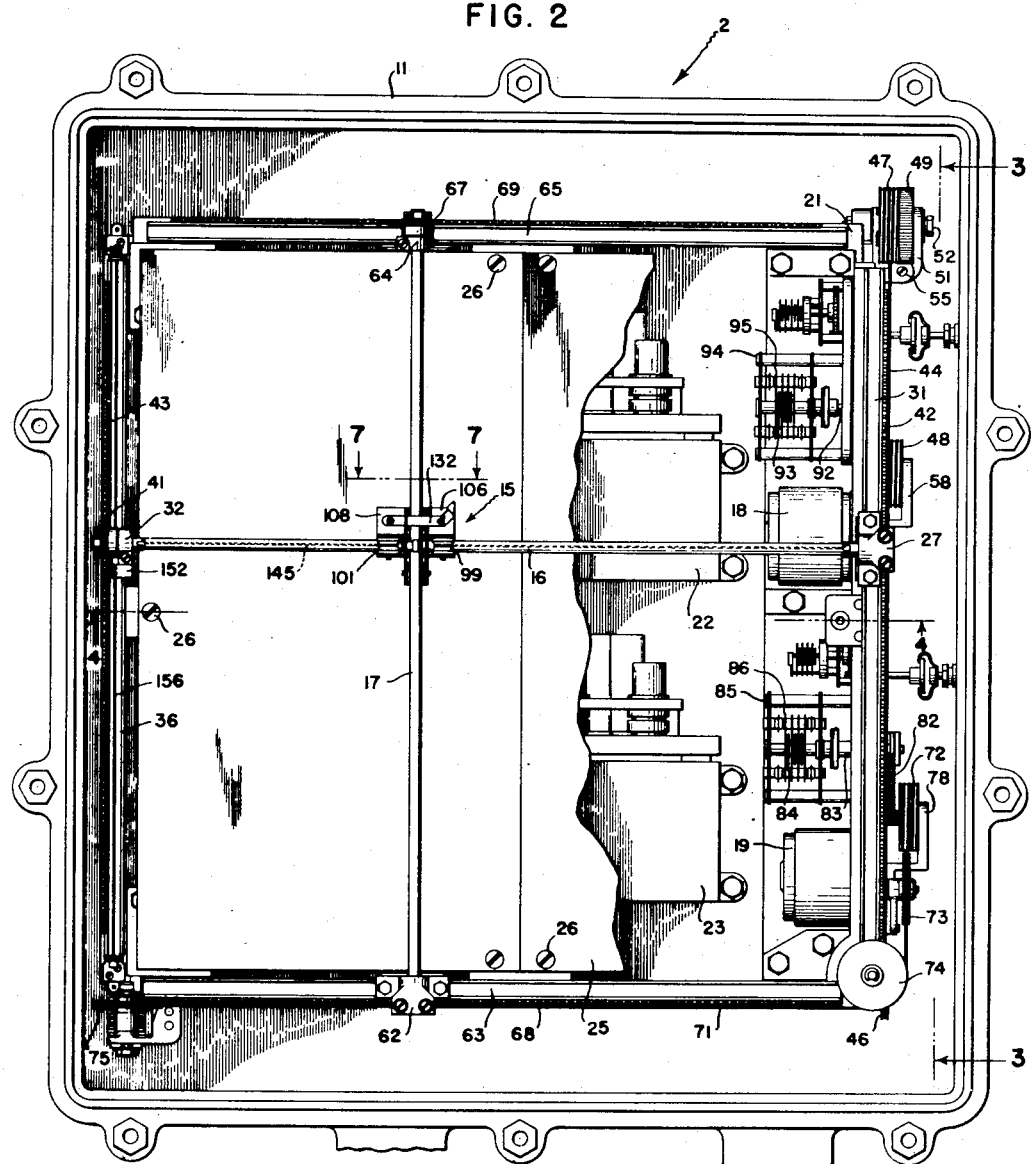
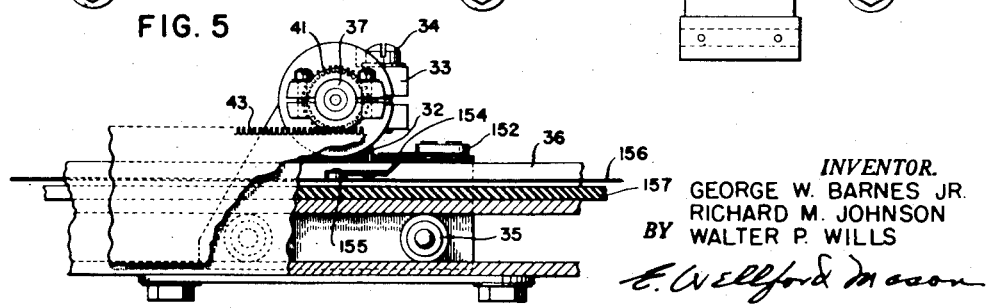
*INVENTOR.*
GEORGE W. BARNES JR.
RICHARD M. JOHNSON
BY WALTER P. WILLS
ATTORNEY.

Sept. 4, 1951    G. W. BARNES, JR., ET AL    2,566,546
TELAUTOGRAPHIC INSTRUMENT
Filed Oct. 6, 1945    6 Sheets-Sheet 3

INVENTOR.
GEORGE W. BARNES JR.
RICHARD M. JOHNSON
BY WALTER P. WILLS

ATTORNEY.

Sept. 4, 1951  G. W. BARNES, JR., ET AL  2,566,546
TELAUTOGRAPHIC INSTRUMENT

Filed Oct. 6, 1945  6 Sheets-Sheet 4

*INVENTOR.*
GEORGE W. BARNES JR.
RICHARD M. JOHNSON
BY WALTER P. WILLS

ATTORNEY.

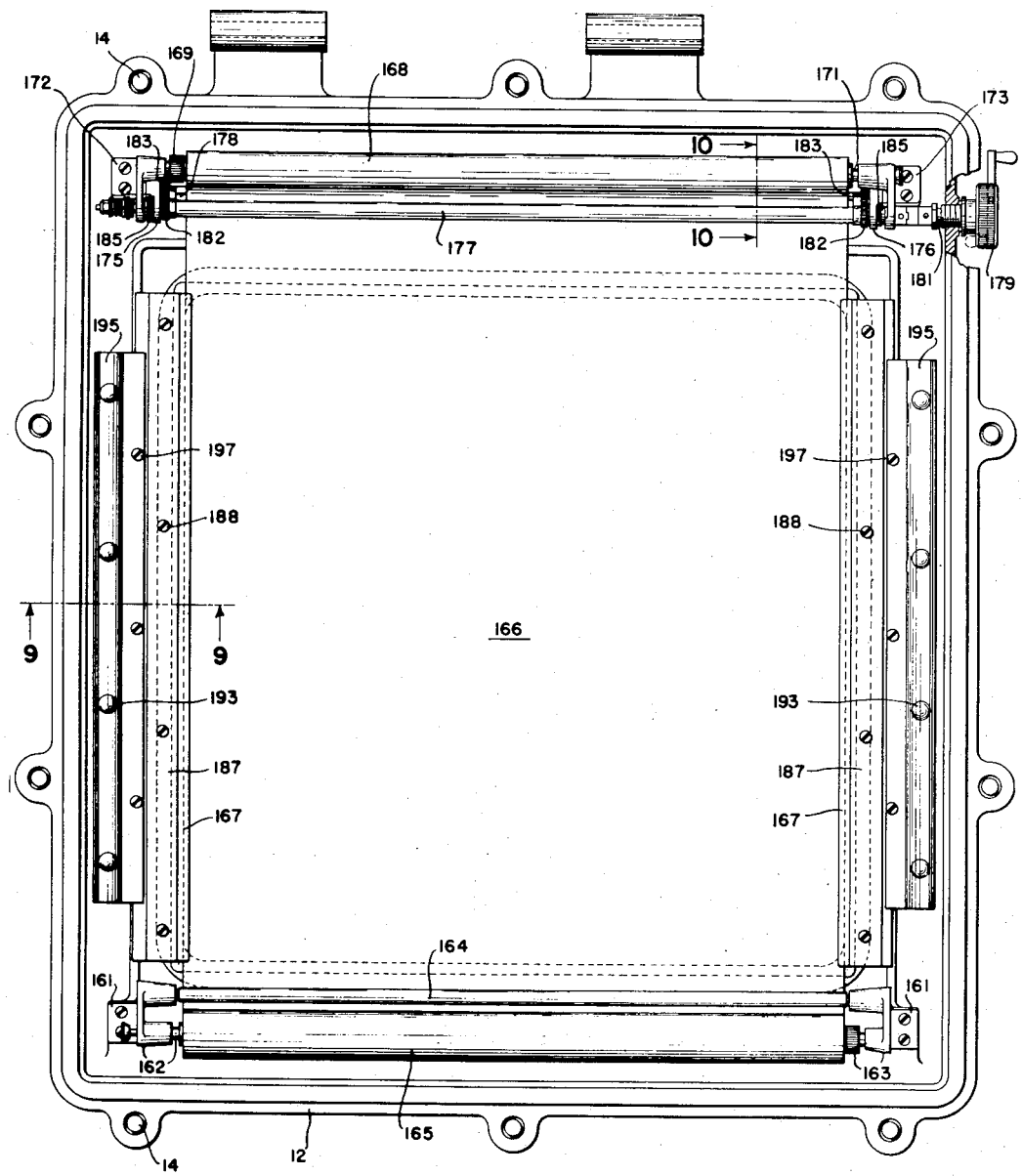

Sept. 4, 1951  G. W. BARNES, JR., ET AL  2,566,546
TELAUTOGRAPHIC INSTRUMENT

Filed Oct. 6, 1945  6 Sheets-Sheet 6

INVENTOR.
GEORGE W. BARNES JR.
RICHARD M. JOHNSON
BY WALTER P. WILLS

ATTORNEY.

Patented Sept. 4, 1951

2,566,546

UNITED STATES PATENT OFFICE 2,566,546

TELAUTOGRAPHIC INSTRUMENT

George W. Barnes, Jr., Clifton Heights, Pa., Richard M. Johnson, Palmyra, N. J., and Walter P. Wills, Philadelphia County, Pa., assignors, by mesne assignments, to Minneapolis-Honeywell Regulator Company, Minneapolis, Minn., a corporation of Delaware Application October 6, 1945, Serial No. 620,828

11 Claims. (Cl. 346—139)

The present invention relates to recording instruments or systems, and in particular to instruments of the telautographic type in which a message to be dispatched is written in one location and is received in duplicate at a remote location. The present application is directed more particularly to the construction of the mechanism forming the receiving station of the system. A copending application of G. W. Barnes, J. F. Goetz, and W. P. Wills, Ser. No. 620,827, filed on Oct. 6, 1945, and now Patent 2,508,592, patented May 23, 1950, is particularly directed to the details of the mechanism forming the sending or transmitting station. Attention is also directed to the application of R. F. Wild, Ser. No. 620,832, filed Oct. 6, 1945, and now Patent 2,530,928, patented November 21, 1950, in which there is disclosed an electrical transmitting ssytem by means of which movements of a writing implement in the transmitting station may be used to energize motors which drive a recording pen in the receiving station.

The receiving station consists of a recording instrument provided with a recording pen which is driven in one direction by one electric motor that is energized in response to unbalance of an electric circuit and is driven at right angles to the first direction by a second electric motor that is energized for rotation in response to unbalance of a second circuit. By unbalancing the circuits simultaneously in varying amounts and directions, the pen may be moved in any direction to draw any type of curve or to write. The pen is mounted under a chart so that a record is made on the under side thereof. The record is made legible from above by means of lights located under the chart that outline the record. The advantage of this construction is to make an instrument in which the front of the chart is entirely clear of obstructions so that the record may be seen in its entirety and the surface of the instrument may be used as a plotting board. A means is also provided to keep the pen out of engagement with the chart until such time as a mark is to be made thereon. This means that the pen can make individual marks on the chart without a connecting line between them.

It is an object of this invention to provide a recording instrument in which a record is made on one side of a chart with the record being viewed from the opposite side thereof. It is also an object of the invention to provide an instrument with suitable lamps located behind the chart so that it can be viewed from the front.

It is a further object of the invention to provide a recording instrument in which the pen may be moved in any direction with relation to the chart, and may be moved into and out of engagement with the chart at will. It is a further object of the invention to provide a pen carriage that is carried by a pair of horizontal bars extending at right angles to each other, the arrangement being such that the pen carriage is moved as either or both of the bars is moved and is always located at a point where the bars cross each other.

It is a further object of the invention to provide a means to mount a pair of rods at right angles to each other and to move these rods in a direction perpendicular to their axes. The rods are adapted to carry jointly a pen carriage so that this carriage may be moved to any position within the range of movement of the rods and to any position along the length of either rod. If the instrument in which the rods are located is mounted in a vertical position, some means will be necessary to counterbalance the weight of the pen carriage and the rod that is moved vertically. It is, accordingly, a further object of the invention to provide a means to counterbalance the weight of the vertically moving rod and the pen carriage so that substantially the same force is used to move the rod either upwardly or downwardly.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 3:
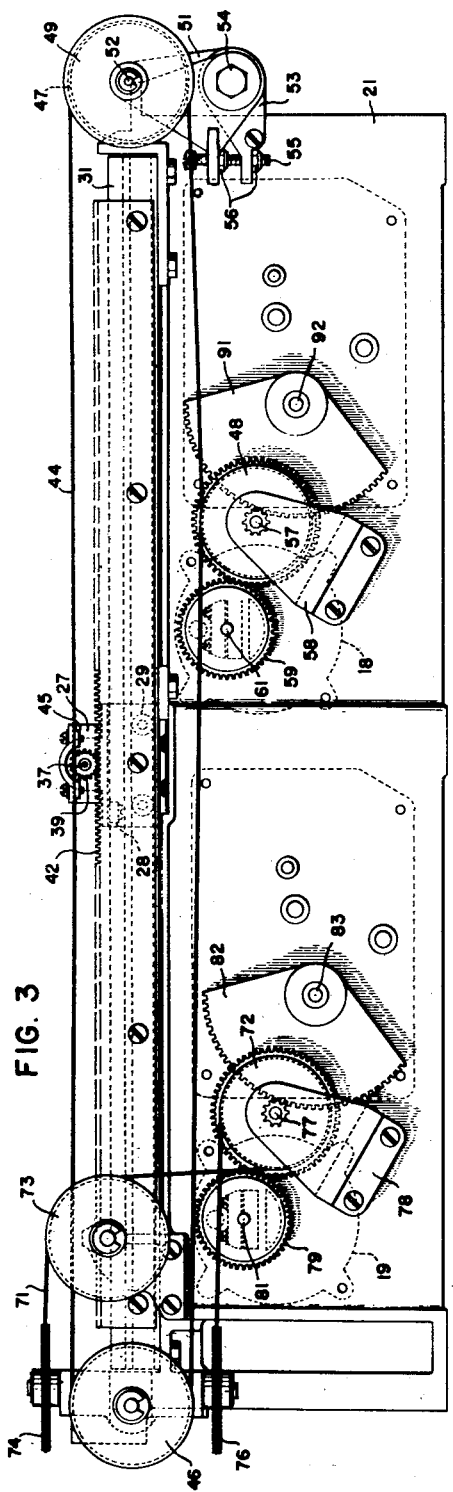
Figure 4:
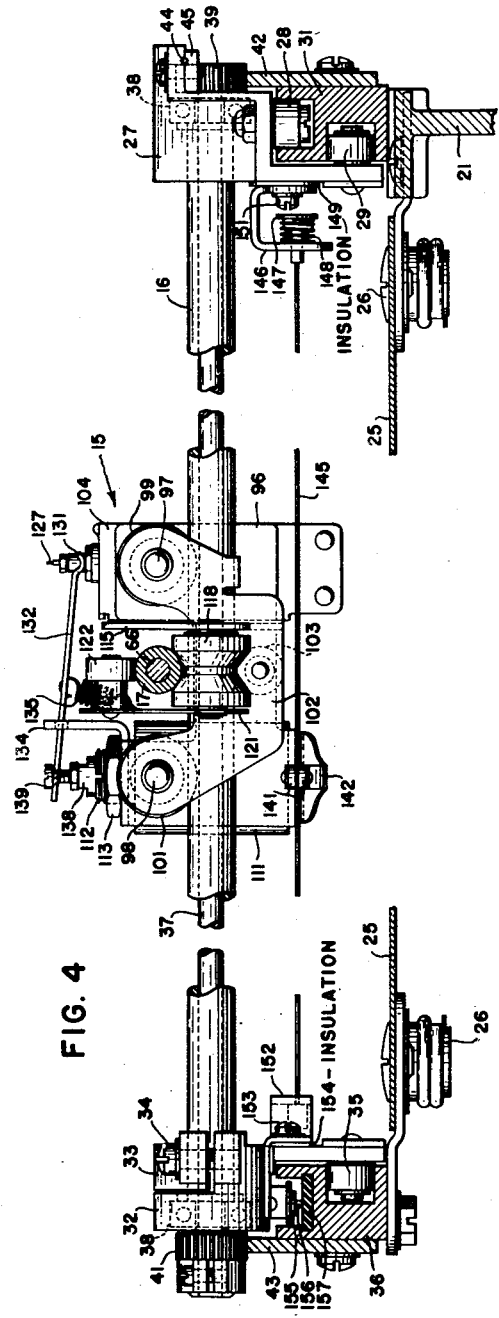
Figure 6:
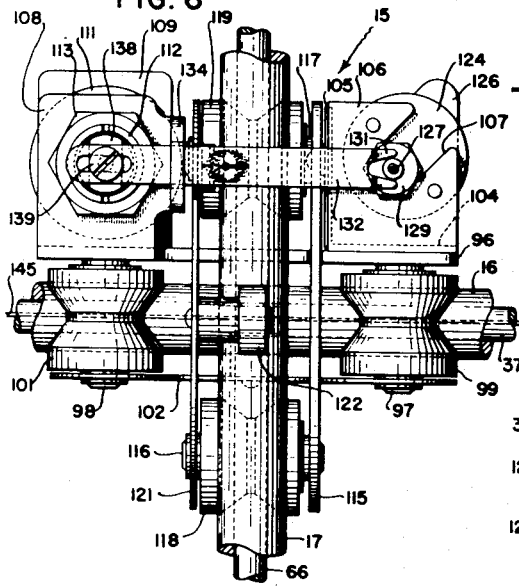
Figure 7:
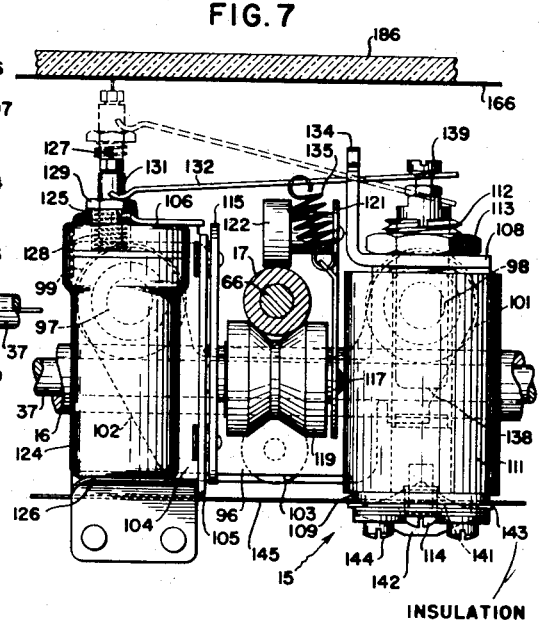
Figure 9:
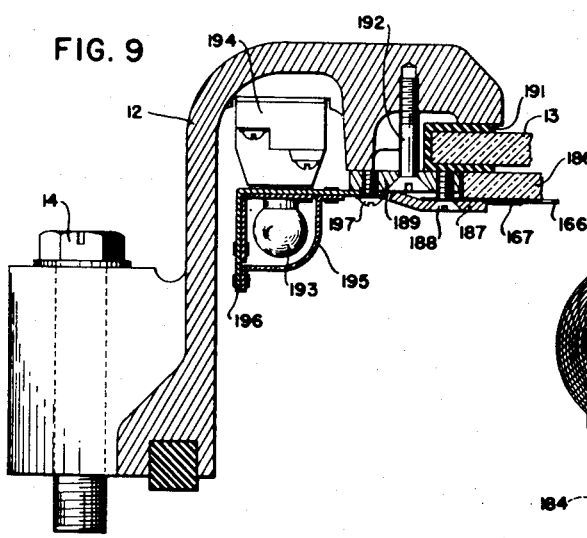
Figure 10:
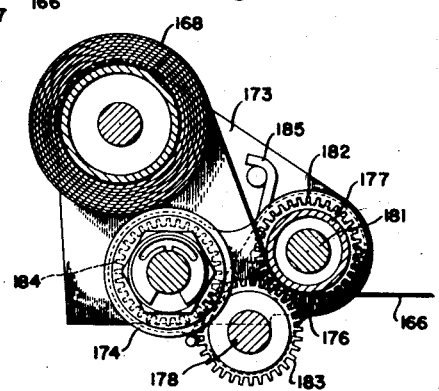

In the drawings:

Figure 1 is a view of the telautographic system showing diagrammatically a transmitting unit and a receiving unit, Figure 2 is a view of the various parts of the receiving unit that are contained in the lower half of the casing thereof, Figure 3 is an end view of the frame supported in the lower half of the casing as taken on line 3—3 of Figure 2 omitting certain parts of the pen driving mechanism, Figure 4 is a view taken on line 4—4 of Figure 2, Figure 5 is a view, partly in section, looking from the left in Figure 4, Figure 6 is an enlarged top view of the pen carriage and its supporting members, Figure 7 is a view of the pen carriage on line 7—7 of Figure 2, Figure 8 is a view looking into the interior of the top of the receiving unit, Figure 9 is a view taken on line 9—9 of Figure 8 with the parts thereof inverted, and Figure 10 is a view on line 10—10 of Figure 8.

Figure 11:
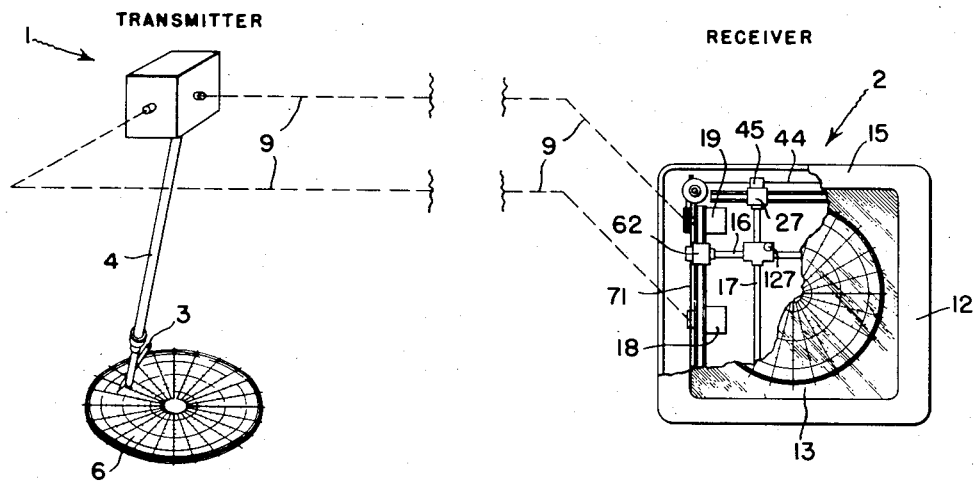

Figure 11 is a schematic diagram with parts in perspective and parts in front elevation broken away to show the parts beneath.

Referring first to Figures 1 and 11 there is shown in those figures the components of a telautographic system comprising a transmitting unit 1 and a receiving unit 2. The transmitter includes a writing implement 3 which is mounted on the end of a supporting arm 4 and which is moved by means of a handle 5 to any position upon a writing surface 6. The arm 4 is supported by a mechanical arrangement 7 which permits movement of that arm either in a direction parallel to the plane of the paper or in a direction perpendicular to the plane of the paper or at any angle to those directions. The transmitting unit incorporates therein portions of a pair of balanceable electrical systems. The arrangement of these systems is such that as the writing implement is moved in one direction, one system will be unbalanced and as the writing implement is moved in a direction at right angles thereto, the other system is unbalanced. The details of this construction do not form a part of the present invention, but are disclosed and claimed in the above mentioned Barnes et al. application. The unbalance of these systems is transmitted through suitable electrical connections including the cables 9 to the receiving unit where an arrangement is used to energize a motor in response to unbalance of each system to rebalance the same. As the systems are rebalanced by the motors in the receiving unit, a pen is moved across a suitable chart so that movements of the writing implement 3 of the transmitter are exactly duplicated by the pen of the receiving instrument. The word "Record" which is seen in Fig. 1 through window 13 is a specimen of a typical record which can be made by this device. The details of the transmitting unit are described and claimed in the above mentioned Barnes et al. application while the details of the electrical transmitting system are disclosed in the above mentioned Wild application. The details of those applications do not form a portion of this invention, but are only of interest in forming broadly elements of the combination of the present invention.

The receiving unit 2 is enclosed in a casing formed of a base casting 11 and a top casting 12, the latter of which is provided with a suitable window 13. These parts are held together by bolts 14 and may be provided with hinges so that when the bolts are loosened, the top may be moved away from the bottom without the necessity of completely disassociating these parts. When this is done access is obtained to the mechanism located in both the top and the bottom of the casing. The hinges are preferably located at the bottom of the unit so that when it is swung open no means is necessary to hold it in that position.

It will be seen from an inspection of Figure 2 that there is provided a pen carriage 15 that is moved vertically by a horizontally extending bar 16 and which is moved in a horizontal direction by a vertically extending bar 17. Therefore, as these bars move, either simultaneously or individually, the pen carriage may be moved to any point within the space encompassed by the limits of movement of the bars 16 and 17. The bar 16 is moved in a vertical direction by means of a drive motor 18 that is energized in response to the unbalance of one of the electrical circuits that was mentioned above, and bar 17 is moved in a horizontal direction by a motor 19 that is energized for rotation in response to unbalance of the other electrical circuit which was mentioned above.

The rods are guided for movement on pairs of tracks that form a rectangle and that are suitably attached to the bottom of the casting 11. The right track has a plate or frame 21 under it upon which the motors and various other parts to be described are mounted. Located within the confines of the frame formed by the tracks are a pair of amplifiers 22 and 23 each of which forms a portion of one of the electrical circuits. These amplifiers and other mechanism located within the framework are normally protected by a shield or backing plate 25 which is formed in two parts and which is fastened by screws 26 to the tracks so that it substantially covers the area of the frame and extends between the amplifiers and the pen carriage.

As shown in Figures 2 and 4, bar 16 is mounted on rails or tracks that extend vertically. This bar is tubular and has its right end (Figure 4) mounted in a carriage 27 which is provided with guide rollers 28 and 29 that are received in grooves in a track 31 which is attached to the top of frame 21. It will be seen that the roller 28 definitely guides the carriage as it is being moved up and down and the roller 29 holds the carriage in place on the track.

The left end of bar 16 is supported by a carriage 32 and the bar is held in this carriage by a clamping collar 33 and a screw 34. In assembling these parts the bar is moved axially to the right in a suitable opening in carriage 27 and is held in place in carriage 32 by members 33 and 34. Carriage 32 is provided with a downwardly extending portion that has attached to it a roller 35 which is received in a suitable groove formed in a track member 36. This roller serves to hold the carriage in the proper position with respect to its track. It will be seen that the cooperation of the three rollers 28, 29 and 35 with their respective tracks confines bar 16 to a definite path of movement.

As the bar 16 and the carriages 27 and 32 are moved upwardly and downwardly along the tracks 31 and 36, some means must be provided so that the ends of the bar will be kept at exactly the same level. To this end the bar is made tubular and has a rod 37 extending through it. The rod has fastened upon its right end a pinion 39 and to its left end a pinion 41 which pinions mesh with racks 42 and 43, respectively, that are attached to tracks 31 and 36. Suitable bearings 38 are provided in bar 16 so that rod 37 may rotate freely.

Bar 16 is moved upwardly and downwardly in a vertical direction by means of a cable 44 that is attached to carriage 27 by a clamp 45. This cable passes over a pair of guide pulleys 46 and 47 and is wrapped around a drive pulley 48. The pulley 47 is formed on a spring drum 49 of a conventional type which always tends to rotate in a clockwise direction in Figure 3. The spring tension of this drum is so adjusted that it is sufficient to counterbalance the weight of rod 16 and parts attached thereto and the pen carriage 15. Thus as the carriage is moved in a vertical direction, the drive motor has substantially the same load in both directions which load is only negligible. If the receiving unit is placed in a horizontal rather than a vertical position, the spring effect of pulley 49 may be disconnected since the load on the motor would then be the same for each direction of movement.

The combined spring drum and pulley 47, 49 are mounted for rotation on a shaft 52 that projects from a bracket 51. This bracket is in turn mounted on a shaft 54 projecting from a bracket 53 that is attached to the frame member. Brackets 51 and 53 may be adjusted angularly with respect to each other in order to vary the tension of cable 44 by means of a set screw 55 that is held in its adjusted position by lock nuts 56. The drive pulley 48 is mounted on a shaft 57 that is journaled for rotation at one end in frame 21 and at the other end in a bracket 58 that is fastened to the side of the frame. This pulley is driven by suitable gearing 59 that is attached to the shaft 61 of motor 18.

From the above description it will be seen that in the overall operation of the device as thus far described, a movement of the writing implement 3 of the transmitter unit in one direction will cause unbalance of an electrical circuit. This unbalance working through a suitable amplifier produces a corresponding energization of motor 18. As the motor rotates in one direction or the other, it will rotate drive pulley 48 through gearing 59 and therefore move the cable in one direction or the other. This cable, since it is attached to carriage 27, will move that carriage and the parts attached thereto in a vertical direction. Carriage 32 will always be maintained at exactly the same position vertically as carriage 27 because of the action of the pinions on the ends of rod 37. As the motor 18 is rotated to rotate drive pulley 48, it will operate through additional gearing 91 to rotate a shaft 92. This shaft is attached to movable plates 93 of a variable condenser 94 and serves to move them relative to a set of stationary plates 95. As the movable plates are moved relative to the stationary plates in synchronism with the movement of bar 16, the electrical network will be rebalanced when bar 16 has been moved to a position exactly corresponding with the position of the writing implement 3 of the transmitting unit.

Vertically extending bar 17 which serves to position the pen carriage 15 in a horizontal direction lies above bar 16 and has attached to its lower end a carriage 62 that is exactly the same as carriage 27 on the right end of bar 16. Carriage 62 cooperates with a track 63 that is attached at one end of the upper surface of frame 21 and at its other end by a suitable support to the bottom of casting 11. The upper end of bar 17 has attached to it a carriage 64 engaging a track 65. This carriage is provided with a roller similar to roller 34 of the carriage 32 on the left end of bar 16. This upper carriage 67 functions, as far as supporting and guiding the bar 17 is concerned, in exactly the same fashion as carriage 32 supports and guides the left end of bar 16. Bar 17 is also provided with a shaft 66 that extends through it in the same manner to that in which shaft 37 extends through the bar 16. This shaft has mounted on its ends pinions, only one of which 67 is shown, which pinions cooperate with racks 68 and 69 that are attached to the tracks 63 and 65 respectively.

Bar 17 is driven in a horizontal direction by means of a cable 71 that is attached suitably to carriage 62. This cable passes around a drive pulley 72 and around suitable guide pulleys 73 to 76 inclusive which guide the cable through a path parallel to the path of movement of carriage 62 and back to drive pulley 72. In this case the drive pulley is mounted on a shaft 77, one end of which is journaled for rotation in frame 21 and the other end of which is journaled for rotation in a bracket 78 that is suitably attached to the outside of the frame. Drive pulley 72 is rotated through gearing 79 from shaft 81 of the motor 19 in a manner similar to that described in connection with motor 18. Gearing 82 is used to rotate a shaft 83 which extends through the frame and has attached to its inner ends movable plates 84 of a variable condenser 85. This condenser is provided with stationary plates 86 so that the condenser is adjusted as the motor 19 is rotated. It is noted that pulley 75 is preferably mounted on a bracket similar to bracket 51 upon which pulley 47 is mounted. This is to permit adjustment of the pulley to place cable 71 under the proper tension.

From the above description it will be seen that as the writing implement 3 of the transmitting unit is moved in a direction at right angles to the previously mentioned direction, an electrical circuit will be unbalanced to energize motor 19 for rotation in one direction or the other. This motor drives cable 71 through suitable mechanism to move bar 17 in a horizontal direction and to adjust simultaneously the variable condenser 85. When the bar is adjusted to a position corresponding exactly to the position of writing implement 3, the electrical circuit will again be balanced. Therefore any movement of the writing implement 3 in the transmitting unit will unbalance the electrical circuits and motors 18 and 19 will be energized to adjust one or both of the bars 16 and 17.

The pen carriage 15 is mounted for movement on the two bars 16 and 17 so that as these bars are moved to various positions the pen carriage will be similarly shifted. Therefore the pen carriage can be moved in such a manner that any desired curve or writing made by the transmitter unit will be duplicated by the receiver unit. The pen carriage consists of a plate 96 that has extending from it two stud shafts 97 and 98 which have rollers 99 and 101, respectively, journaled for rotation thereon. These rollers engage the upper surface of the bar 16. In order to prevent the rollers from having a tendency to jump off the bar a spring plate 102 is fastened to the outer end of the shafts 97 and 98. This plate extends downwardly and has journaled on a pin projecting from its lower end a small roller 103 that bears against the lower surface of the bar 16 midway between the rollers 99 and 101.

An upstanding portion of the plate 96 has attached to it by suitable means, such as welding, one wall 104 of a pen receiving member. This member has a second wall 105 extending at right angles to wall 104 and also has a top 106 that is provided with a diagonal slot 107. The top of the left end of plate 96 (Figure 6) is bent over at 108 while the bottom is bent over as shown at 109. These parts receive between them a solenoid winding 111 that is held in place by means of a sleeve 112 that extends through plate 108 and is fastened thereto by a nut 113 which is threaded on the sleeve and which engages the top surface of portion 108. The bottom of the solenoid is held rigidly in place by means of screw 114 that projects into the solenoid through portion 109.

Suitably attached to wall 105 of the pen carrying portion is a second plate 115 that extends perpendicularly to plate 96. The second plate has extending to the left, as shown in Figure 6, a pair of stud shafts 116 and 117 that have rollers 118 and 119, respectively, journaled for rotation therein. These rollers engage the lower surface of bar 17 to guide the pen carriage along this bar. In order to prevent any tendency of the rollers to leave the bar, a spring plate 121 is attached to the outer ends of the shafts 116 and 117. This plate has journaled on a pin projecting therefrom a roller 122 that bears against the upper surface of bar 17 midway between rollers 118 and 119.

For purposes of making marks upon the chart, there is provided a pen 124 which has a neck or extension 125 projecting from its upper surface. This neck is received in the diagonal slot 107 of plate 106. The pen is held in position with the neck projecting through the slot by means of a spring 126 that is attached to the lower end of wall 104 of the pen carrying member. As has been mentioned above, the parts of the instrument so far described are mounted in the lower half of the casing of the receiving unit. The chart upon which a record is made is mounted in the upper half of the receiver unit so that the pin must project upwardly into engagement with the chart. Since, however, it is not desirable to have the pen in engagement with the chart at all times, but only at those times when a record is to be made, some means must be provided to keep the writing point of the pen in engagement with the chart at such times as a record is being made but to remove this writing tip from the chart when a record is not being made. To this end pen 124 is provided with a retractible stylus or writing tip 127 that is normally projected upwardly toward the chart 166 by a spring 128.

The writing tip is moved downwardly against the tension of this spring by engagement between a nut 129 which is formed on the tip support and the forked end 131 of a lever 132 that is mounted for pivotal movement in an upstanding portion 134 of the solenoid receiving member 108. Normally lever 132 is held in its full line position of Figure 7 with the writing tip of the pin retracted by means of a spring 135, but lever 132 may be moved in a clockwise direction to the dotted line position of Figure 7 by means of a solenoid core 138 which is moved when solenoid 111 is energized. To this end the solenoid core has threaded into its upper end a screw 139 whose head is received in a slot formed in lever 132.

As has been explained, it is desirable to maintain the writing tip of the pen out of engagement with the chart at such times as a record is not being made. To this end there must be provided some means for energizing solenoid 111 so that its core 138 will be retracted to permit the writing tip of the pen to engage the chart at such times as a record is being made. In order to accomplish this means are provided in the transmitter to close an electrical circuit for the solenoid each time the writing implement 3 of the transmitter is moved into engagement with the writing surface 6. The details of this mechanism are not pertinent to the present disclosure since they are described in detail in the above mentioned Barnes et al. application. It is sufficient for purposes of this disclosure to say that a circuit for the solenoid is closed each time the writing implement 3 is brought into engagement with the writing surface 6. Therefore some means must be provided in the receiving unit so that the solenoid can be energized no matter what its position beneath the chart may be. Such connections will now be described.

One of the terminals of the solenoid is grounded to the instrument framework through the pen carriage and its supporting rods. The other terminal is fastened to suitable contacts 141. To this end the pair of contacts 141 are mounted on a support 142 that is separated from part 109 by means of insulation 143, the various parts being held in position on part 109 by means of suitable screws 144. The contacts 141 engage a wire 145 which is carried by the carriages 27 and 32 that are attached to the ends of bar 16. As is illustrated in Figure 4, the right end of the wire 145 is mounted on a bracket 146. The wire is provided with a button 147 on its end that is separated from the bracket by a spring 148. This spring serves to keep the wire under the proper tension. Bracket 146 is insulated from carriage 27 by an insulating member 149 and is attached to the carriage by screws 151. The left end of wire 145 is fastened to a bracket 152 that is in turn attached to carriage 32 by screws 153. The bracket is insulated from the carriage by an insulating member 154. Bracket 152 has a portion thereof extending to the left over a groove that is formed in track 36. Attached to the extending end of bracket 152 is a contact 155 that bears in all positions of bar 16 on a wire 156 that extends between the ends of the track and is insulated from this track. Wire 156 is backed up in the track by an insulating piece 157 that is placed in the bottom of the groove formed in the track. Wire 156 is suitably connected through cables to mechanism in the pen arm 4 of the transmitter. Thus when the writing implement 3 of the transmitter is moved into engagement with the writing surface 6, a contact will be closed to energize solenoid 111 and thereby draw its core or armature 138 downwardly to overcome the force of spring 135. This permits lever 132 to rock counterclockwise in Figure 4 or clockwise in Figure 7 so that spring 128 may force the writing tip 127 upwardly into engagement with the chart that is carried by the top of the receiver unit casing.

The interior of the top 12 of the receiving unit is shown in Figure 8. This top is preferably a casting and has attached on its lower end on each side small castings 161 which support mandrels for the supply roll. The left mandrel is designated by reference numeral 162 and the right mandrel is designated by reference numeral 163. These support a supply roll 165 of chart 166 that is moved across the window 13 which is fastened in the casting. As the chart leaves the supply roll it passes beneath a guide roll 164 and the edges thereof are guided by members 167 which serve to hold the chart against a suitable backing plate. The chart is supplied to a takeup roll 168 shown in the upper part of the figure. The takeup roll is mounted on its left end by a mandrel 169 and on its right end by a mandrel 171 that are similar to the mandrels which support the supply roll. These mandrels are journaled in castings 172 and 173, respectively, that are fastened in a suitable manner to the inside surface of the top 12. The takeup roll is wound to move the chart across the window by means of frictional engagement therewith of a drive roller 174 (Fig. 10) that is mounted by its right and left ends respectively in frame members 175 and 176 which are pivoted to the castings 172 and 173, respectively. The chart on its way to the takeup roll passes underneath a guide roll 177 that is mounted concentrically with the pivot points for the frames 175 and 176.

Rotation is imparted to the drive roll by means of a handle 179 that is located on the exterior of the wall of top 12. This handle is mounted on a shaft 181 that is extended through the wall and guide roll 177 and is attached to this roll. As the guide roll is rotated, gears 182 on each end thereof engage idler pinions 183 on the rod 178 which in turn mesh with and drive gears 184 attached to the ends of the drive roll 174. Therefore as the handle 179 is rotated, the takeup roll will be rotated. The drive roll is forced into engagement with the surface of the takeup roll by means of springs 185, one of which acts on each of the frame members 175 and 176 to force the takeup roll into frictional engagement with the surface of the drive roll. The springs permit the drive roll and its supporting parts to turn counterclockwise in Figure 10 around shaft 181 as the takeup roll increases in diameter. It is noted that a suitable and conventional brake may be used on the supply roll 165 in order to prevent overrunning of this roll so that the paper will remain taut over the writing surface. In a similar manner some type of one-way or friction clutch may be used in connection with either the takeup roll or the drive roll 174 so that the takeup roll will not be rotated in a reverse direction to permit the paper to become slack.

As the chart paper moves from the supply roll to the takeup roll, it is held by guides 167 against a glass or other transparent backing plate 186 as is best shown in Figure 9. This plate may have printed or etched upon it suitable coordinates than can be used with respect to the type of material that is to be written upon the chart. The guides and backing plate 186 are held in position on each side by a clamp member 187 and screws 188. It will be seen from an inspection of Figure 9 that backing plate 186 lies underneath window 13 that is fastened in the top. This window is held in position by a clamp 189 that pinches the window between a suitable gasket 191 and the edge of the opening formed in the frame. Clamps 189 are held in place by screws 192.

Inasmuch as the writing upon the chart takes place on its lower surface some means must be provided to illuminate this chart from below so that the writing thereon may be read from above. To this end a series of electric light bulbs 193 are located along each side of the chart and the light from these bulbs is reflected by plates 25, which are preferably painted in a light color, up through the chart so that marks thereon may clearly be seen. These bulbs are mounted in sockets 194 that are attached to the top as best show in Figure 9. In order that the illumination of the chart may be even or that it may be colored if desired, a light diffusing or coloring member 195 is placed over the bulbs 193 so that light from the bulbs will shine through it and be reflected from backing plate 25. The light diffusing member is held in place by an angle member 196 that is held in position on clamp 189 by screws 197.

From the above description it will be seen that we have provided a recording instrument in which a record is made on the under surface of the chart by means of a pen that can be moved in any direction to any point thereon. This means that the entire surface of the chart is open for inspection from above and that the chart is not obstructed in any fashion. Means is also provided to insure that the pen will not be moved into engagement with the chart until such time as it is desired to make a record thereon. These features when taken in connection with the other features of the invention provide a compact, versatile, recording unit.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that is some cases certain features of the invention may sometimes be used to advantage without a corresponding use of other features.

Having now described our invention, what we claim as new and desire to secure by Letters Patent is:

1. In a recording instrument, a pen carriage, means to move said carriage through a path comprising a hollow bar to which said carriage is attached, a pair of tracks each extending substantially perpendicular to the axis of said bar and adjacent the ends thereof, means mounted on the ends of said bar to engage and be guided by said tracks, a shaft extending through said bar, a gear attached to each end of said shaft, a rack attached to each track in a position to be engaged by said gears, and drive means attached to one of said means mounted on the ends of said bar to move said bar and the carriage attached thereto to different positions along said tracks.

2. In a recording instrument, a rectangular frame the upper edges of which form pairs of parallel tracks extending at right angles to each other, a pair of elongated supports each mounted for movement on one of said pairs of parallel tracks, a pair of drive motors attached to the inside of one of the sides of said frame, a pair of drive pulleys attached to the outside of said side of the frame, drive means between each motor and a corresponding one of said pulleys, a first cable attached to the end of the support riding upon the track formed on said side, said cable passing over one of said pulleys and being driven thereby, a second cable attached to one end of the other of said supports and passing over the other of said drive pulleys, means to guide said second cable around the corner from the side of said frame to which its drive pulley is attached to the side of the frame upon which said other of said supports is mounted, and a pen carriage mounted for movement upon both of said supports whereby it may be moved in any direction depending upon which of said drive motors is rotating and the direction of its rotation.

3. In a recording instrument, a first support mounted to move in a horizontal direction, a second support mounted to move in a vertical direction, said supports crossing each other at all points in their paths of movement, a pen carriage mounted for movement on said supports at the point where they cross whereby it may be moved either horizontally or vertically or both as said supports are moved, a first drive motor, connecting means between said first drive motor and said first support whereby rotation of said first motor will drive said first support to move said carriage in a horizontal direction, a second drive motor, connections between said second drive motor and said second support whereby rotation of said second drive motor will move said carriage in a vertical direction, and means cooperating with said second mentioned connections to substantially counterbalance the weight of said pen carriage and said second support so that said second drive motor will need substantially the same power to raise or lower said pen carriage and second support.

4. In a recording instrument, a pen carriage including a frame, a pen mounted on said frame, a writing tip on said pen, means to project resiliently said tip upwardly from said pen, means mounted on said frame and acting to hold normally said tip in a retracted position, and means also mounted on said frame to overcome the action of said holding means.

5. In a recording instrument, a movable pen carriage, a pen mounted on said pen carriage, a movable writing tip on said pen, resilient means to bias normally said writing tip to writing position, a pivoted lever having one end cooperating with said writing tip, means to bias said lever in a position in which said writing tip is retracted from writing position, a solenoid, an armature for said solenoid, means to connect said armature to said lever in opposition to said biasing means whereby when said solenoid is energized said armature will move said lever and let said writing tip move to writing position, and means to supply energizing current to said solenoid in any position of said pen carriage.

6. In a recording instrument, a pen carriage including a frame, a pen mounted on said pen carriage, a movable writing tip for said pen, means to project resiliently said tip to writing position, means mounted on said pen carriage and operating to hold normally said writing tip in retracted position, a solenoid mounted on said pen carriage, a connection between said solenoid and said means, said solenoid operating when energized to move said means to a position in which said means no longer operates on said writing tip, whereby said writing may move to writing position, and means through which energizing current may be supplied to said solenoid.

7. In a recording instrument, a pair of parallel tracks providing a guide, a support having portions overlying portions of said tracks, bearings each interposed between one of said overlying portions and one of said tracks so as to mount said support for guided movement along said tracks, a first conductor extending along one track and insulated therefrom and adapted for connection to one terminal of a source of electricity, a first contact carried by and insulated from said bearing that engages the track along which said first conductor extends and sliding along said first conductor so as to collect electricity therefrom, a second conductor extending between said bearings and insulated therefrom and having electrical connections with said first contact so as to receive electricity collected by said first contact, a carriage for an exhibiting element mounted on said support so as to be moved thereby to various positions corresponding to the movements imparted to said support, a second contact on said carriage engaging said second conductor as said carriage moves on said support so that said second contact collects electricity from said second conductor, and an electrically operated motor on said carriage having one terminal connected to said second contact on said carriage and the other terminal grounded to the other side of the source of electricity so that the motor, when energized from the source of electricity, actuates the exhibiting element.

8. In a recording instrument, a pen carriage, a pen carried by said carriage for movement to various positions representing movements of a distant transmitter, a solenoid operable to engage said pen with or disengage said pen from a recording chart, means including a first elongated element to move said carriage back and forth in one direction, means including a second elongated element to move said carriage back and forth in a direction at right angles to said first mentioned direction, and means for conducting electricity to said solenoid to energize it, said means comprising, a first wire extending along the path over which said first elongated element moves and adapted for connection to one side of a source of electricity, a contact movable with said first elongated element and insulated therefrom and slidably engaging said first wire to collect electricity therefrom, a second wire extending in a direction at right angles to said first mentioned direction and carried by said first elongated element and insulated therefrom and connected to said contact to receive electricity collected by said first contact, a second contact mounted on said carriage and insulated therefrom and slidably engaging said second wire as said carriage moves along said second wire and receiving electricity from said second wire, an electrical connection between said second contact and said solenoid, and a second electrical connection between said solenoid and the other side of the source of electricity so that said solenoid is energized when electricity is conducted through said wires and said contacts.

9. In a recording instrument, a first supporting member, guide means for said first supporting member to guide the same through a given path, a second supporting member, guide means for said second supporting member to guide the same through a path at right angles to said first mentioned path and overlying the same, a carriage for an exhibiting element carried jointly by said supporting means and movable on each of them so that said carriage may be moved to positions depending upon the positions of said supporting means, electrically operated means carried on and moved to different positions by the movement of said carriage to make a record on a chart, and electric conductors having portions movable relative to each other to supply an energizing current to said electrically operated means in any position of said carriage.

10. In a recording instrument, a casing including a bottom and a top secured thereto so as to be openable and closable with relation to said bottom, a transparent chart backing plate in closely spaced relation with said top, a window in said top of substantially the same dimensions as said transparent backing plate so that records made on said chart over substantially the area adjacent said backing plate are observable through said window, recording mechanism mounted in said casing on the opposite side of said chart from said top and including a movable marking element movable relatively to said chart and to press said opposite side against said backing plate to make a tracing on said chart, and illuminating means mounted in said casing on the opposite side of said chart from said top so as to illuminate the tracing on said chart and to permit observation of said tracing from the other side of said chart through said backing plate and window.

11. A recording instrument as specified in claim 10 wherein said recording mechanism includes means to move said marking element in two coordinated directions over substantially the entire area of said chart which is adjacent said backing plate.

RICHARD M. JOHNSON.
WALTER P. WILLS.
GEORGE W. BARNES, Jr.

REFERENCES CITED

The following references are of record in the file of this patent:

UNITED STATES PATENTS

| Number | Name | Date |
|---|---|---|
| 1,891,502 | Sayre | Dec. 20, 1932 |
| 1,985,265 | Smith | Dec. 25, 1934 |
| 1,985,266 | Smith et al. | Dec. 25, 1934 |
| 2,052,910 | Villiers | Sept. 1, 1936 |
| 2,074,118 | Ross et al. | Mar. 16, 1937 |
| 2,109,283 | Boykow | Feb. 22, 1938 |
| 2,164,412 | Koster | July 4, 1939 |
| 2,179,663 | Link | Nov. 14, 1939 |
| 2,202,547 | Bushnell | May 28, 1940 |
| 2,224,182 | Crooke | Dec. 10, 1940 |
| 2,244,653 | Meer | June 3, 1941 |
| 2,269,240 | Anderson | Jan. 6, 1942 |
| 2,369,922 | Shamah | Feb. 20, 1945 |
| 2,392,916 | Gruss | Jan. 15, 1946 |
| 2,395,351 | Sohn | Feb. 19, 1946 |

OTHER REFERENCES

Brown Pyrometers, Catalog No. 12, page 46.
Standard Instruments Catalog, page 16, Dec. 11, 1946.